US008483847B2

(12) United States Patent
Araki

(10) Patent No.: US 8,483,847 B2
(45) Date of Patent: Jul. 9, 2013

(54) CONTROL SYSTEM AND CONTROL METHOD

(75) Inventor: Katsuhiko Araki, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/039,849

(22) Filed: Mar. 3, 2011

(65) Prior Publication Data
US 2011/0270417 A1 Nov. 3, 2011

(30) Foreign Application Priority Data
Apr. 28, 2010 (JP) ................. 2010-104341

(51) Int. Cl.
G05B 19/18 (2006.01)
G05B 11/01 (2006.01)
G06F 15/177 (2006.01)

(52) U.S. Cl.
USPC ........ 700/2; 700/19; 700/20; 700/23; 709/222

(58) Field of Classification Search
USPC ................ 709/222; 700/2, 19, 20, 23; 713/2
See application file for complete search history.

(56) References Cited

U.S. PATENT DOCUMENTS

| | | | | |
|---|---|---|---|---|
| 4,162,520 A * | 7/1979 | Cook et al. | ............. | 710/1 |
| 4,872,158 A * | 10/1989 | Richards | ............. | 370/380 |
| 4,894,824 A * | 1/1990 | Hemmady et al. | ............. | 370/380 |
| 4,908,800 A * | 3/1990 | DiLemmo | ............. | 367/13 |
| 5,003,466 A * | 3/1991 | Schan et al. | ............. | 714/41 |
| 5,007,013 A * | 4/1991 | Elms | ............. | 709/253 |
| 5,444,707 A * | 8/1995 | Cerna et al. | ............. | 370/389 |
| 5,546,591 A * | 8/1996 | Wurzburg et al. | ............. | 713/322 |
| 5,812,797 A * | 9/1998 | Crane et al. | ............. | 710/100 |
| 6,185,639 B1 * | 2/2001 | Kailash et al. | ............. | 710/48 |
| 6,675,258 B1 * | 1/2004 | Bramhall et al. | ............. | 711/114 |
| 6,687,639 B2 * | 2/2004 | Taniguchi et al. | ............. | 702/117 |
| 6,754,765 B1 * | 6/2004 | Chang et al. | ............. | 711/103 |
| 7,007,077 B1 * | 2/2006 | Shinohara et al. | ............. | 709/220 |
| 7,089,379 B1 * | 8/2006 | Sharma et al. | ............. | 711/154 |
| 7,093,043 B2 * | 8/2006 | Tan et al. | ............. | 710/104 |
| 7,120,161 B1 * | 10/2006 | Gadarowski et al. | ............. | 370/419 |
| 2002/0004905 A1 * | 1/2002 | Davis et al. | ............. | 713/193 |
| 2003/0126347 A1 * | 7/2003 | Tan et al. | ............. | 710/313 |
| 2003/0199999 A1 * | 10/2003 | Roe | ............. | 700/19 |
| 2005/0110546 A1 * | 5/2005 | Park | ............. | 327/185 |
| 2006/0025875 A1 * | 2/2006 | Smith et al. | ............. | 700/86 |
| 2006/0200605 A1 * | 9/2006 | Hatamori | ............. | 710/110 |
| 2006/0271204 A1 * | 11/2006 | Hesse et al. | ............. | 700/2 |
| 2006/0282593 A1 * | 12/2006 | Crane et al. | ............. | 710/300 |
| 2007/0143589 A1 * | 6/2007 | Rawe et al. | ............. | 713/2 |
| 2009/0201650 A1 * | 8/2009 | Hauser et al. | ............. | 361/736 |
| 2010/0199006 A1 * | 8/2010 | Takeuchi | ............. | 710/107 |
| 2010/0323536 A1 * | 12/2010 | Crane et al. | ............. | 439/62 |

FOREIGN PATENT DOCUMENTS

| | | |
|---|---|---|
| JP | 09-146651 A | 6/1997 |
| JP | 2000-112720 A | 4/2000 |

(Continued)

OTHER PUBLICATIONS

Japanese Application No. 2010-104341 Office Action dated May 10, 2011 (English translation attached), 7 pgs.

*Primary Examiner* — Kavita Padmanabhan
*Assistant Examiner* — Thomas Stevens
(74) *Attorney, Agent, or Firm* — Patterson & Sheridan, LLP

(57) ABSTRACT

According to one embodiment, a control system includes a first controller, a second controller, and a network connector. The network connector is configured to network-connect the first controller and the second controller. The first controller is configured to designate an activation mode of the second controller. The second controller is configured to be activated based on firmware corresponding to the activation mode.

8 Claims, 10 Drawing Sheets

FOREIGN PATENT DOCUMENTS

| | | |
|---|---|---|
| JP | 2002-123401 A | 4/2002 |
| JP | 2002-354063 A | 12/2002 |
| JP | 2007-243669 A | 9/2007 |
| JP | 2009-295003 A | 12/2009 |
| JP | 2010-009487 A | 1/2010 |
| JP | 2010-076122 A | 4/2010 |
| WO | WO 2008/114375 | 9/2008 |

* cited by examiner

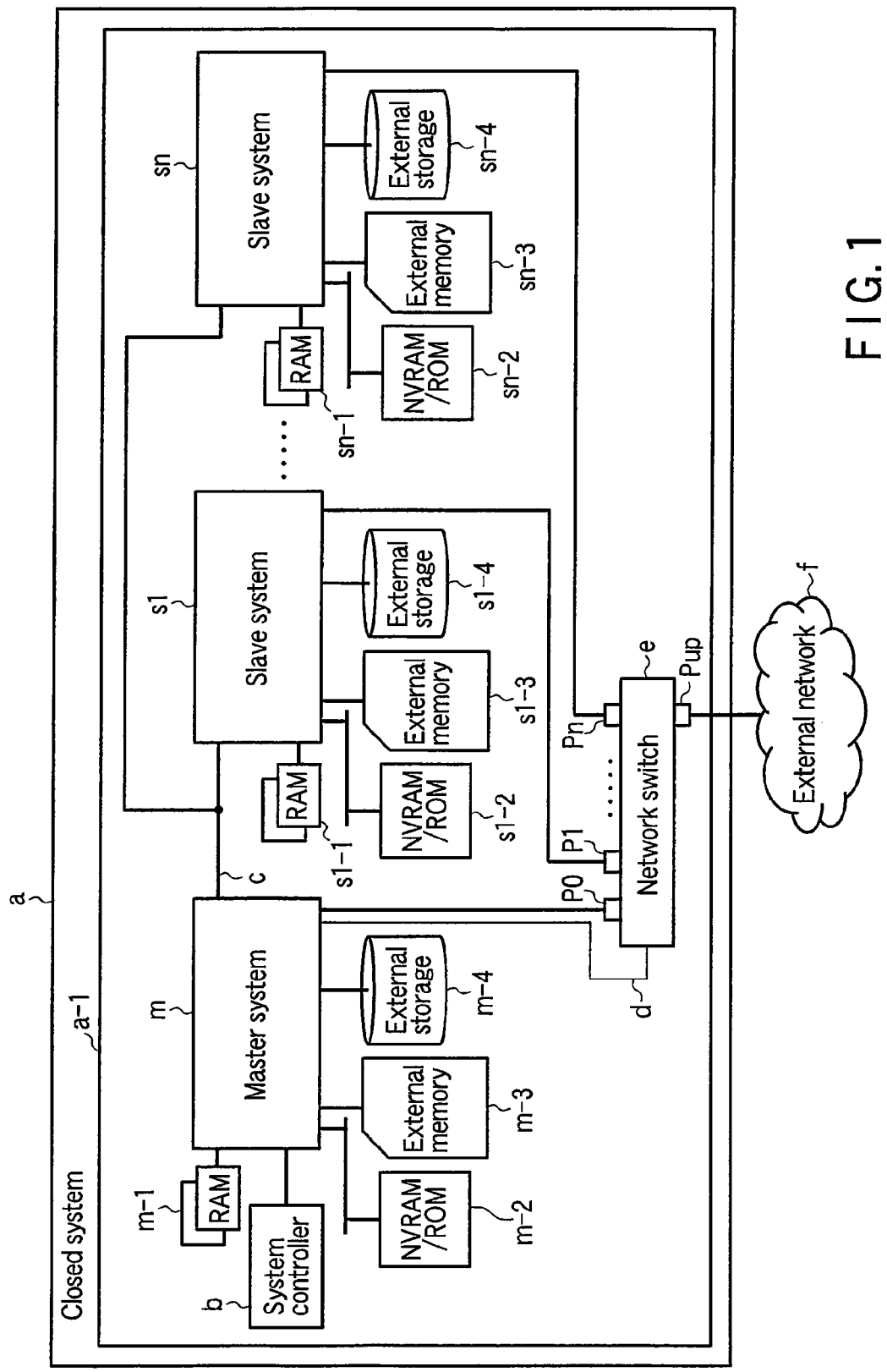
F I G. 1

| Signal name | Description | Notification direction |
|---|---|---|
| Reset #11 | Reset signal | Master->slave |
| Activation mode notification #12 | Activation mode of slave system<br>　Network boot<br>　ROM/FLASH boot<br>　External memory boot<br>　External storage boot<br>　Firmware update/update destination | Master->slave |
| Completion notification #13 | Firmware download completion notification in network boot mode | slave-> Master |
| Boot failure notification #14 | Firmware download failure notification in network boot mode | slave-> Master |
| Firmware update completion notification #15 | Firmware update completion notification of slave system | slave-> Master |
| Firmware update failure notification #16 | Firmware update failure notification of slave system | slave-> Master |
| Activation completion notification #17 | Activation completion notification of slave system | slave-> Master |

F I G. 2

| Command name | Description | Notification direction |
|---|---|---|
| Activation mode notification #22 | Activation mode of slave system<br>　Network boot<br>　ROM/FLASH boot<br>　External memory boot<br>　External storage boot<br>　Firmware update/update destination | Master->slave |
| Completion notification #23 | Firmware download completion notification in network boot mode | slave-> Master |
| Boot failure notification #24 | Firmware download failure notification in network boot mode | slave-> Master |
| Firmware update completion notification #25 | Firmware update completion notification of slave system | slave-> Master |
| Firmware update failure notification #26 | Firmware update failure notification of slave system | slave-> Master |
| Activation completion notification #27 | Activation completion notification of slave system | slave-> Master |

F I G. 3

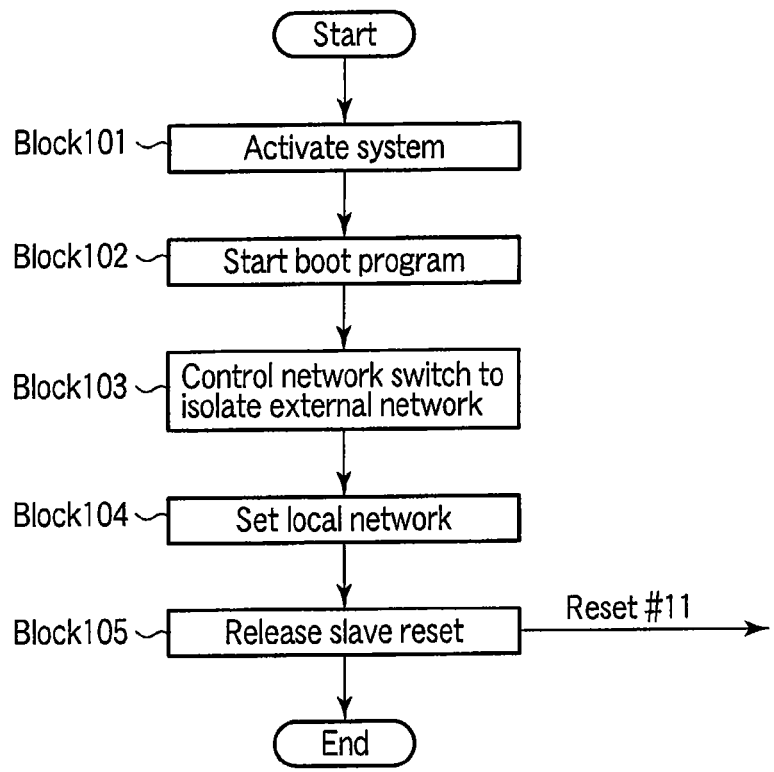
F I G. 4C
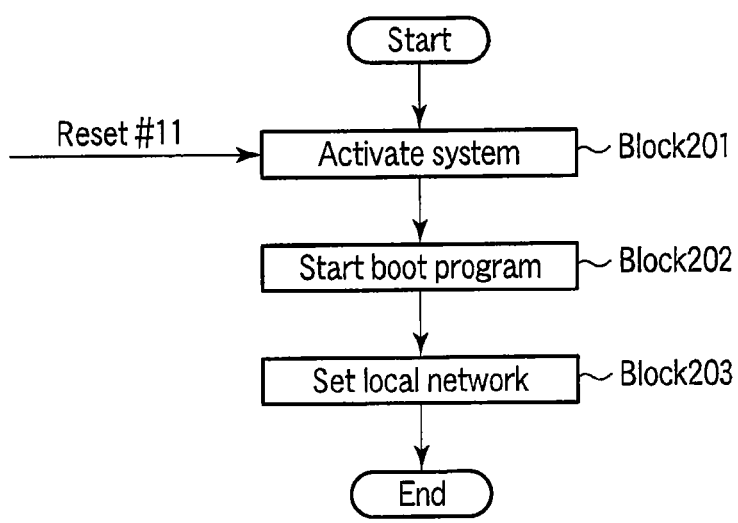
F I G. 4D

CONTROL SYSTEM AND CONTROL METHOD

CROSS-REFERENCE TO RELATED APPLICATIONS

This application is based upon and claims the benefit of priority from prior Japanese Patent Application No. 2010-104341, filed Apr. 28, 2010, the entire contents of which are incorporated herein by reference.

FIELD

Embodiments described herein relate generally to a control system configured by a plurality of controllers, and a control method applicable to this control system.

BACKGROUND

Preboot Execution Environment (PXE) is known as a network boot standard. The PXE specifies protocols that a server and client are to follow.

For example, when a PXE client terminal device executes network boot processing, it is required to activate a PXE server and DHCP server.

A boot mechanism more flexible than the network boot processing according to the protocols described in the PXE is demanded.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is a block diagram showing an example of a common closed system (control system) according to a first, second, and third embodiments;

FIG. 2 is a table showing examples of control signals;

FIG. 3 is a table showing examples of control commands;

FIG. 4C is a flowchart showing an example of partial processing of the first activation processing according to the first embodiment shown in FIGS. 4A and 4B;

FIG. 4D is a flowchart showing an example of partial processing of the first activation processing according to the first embodiment shown in FIGS. 4A and 4B;

DETAILED DESCRIPTION

Figure 4A:
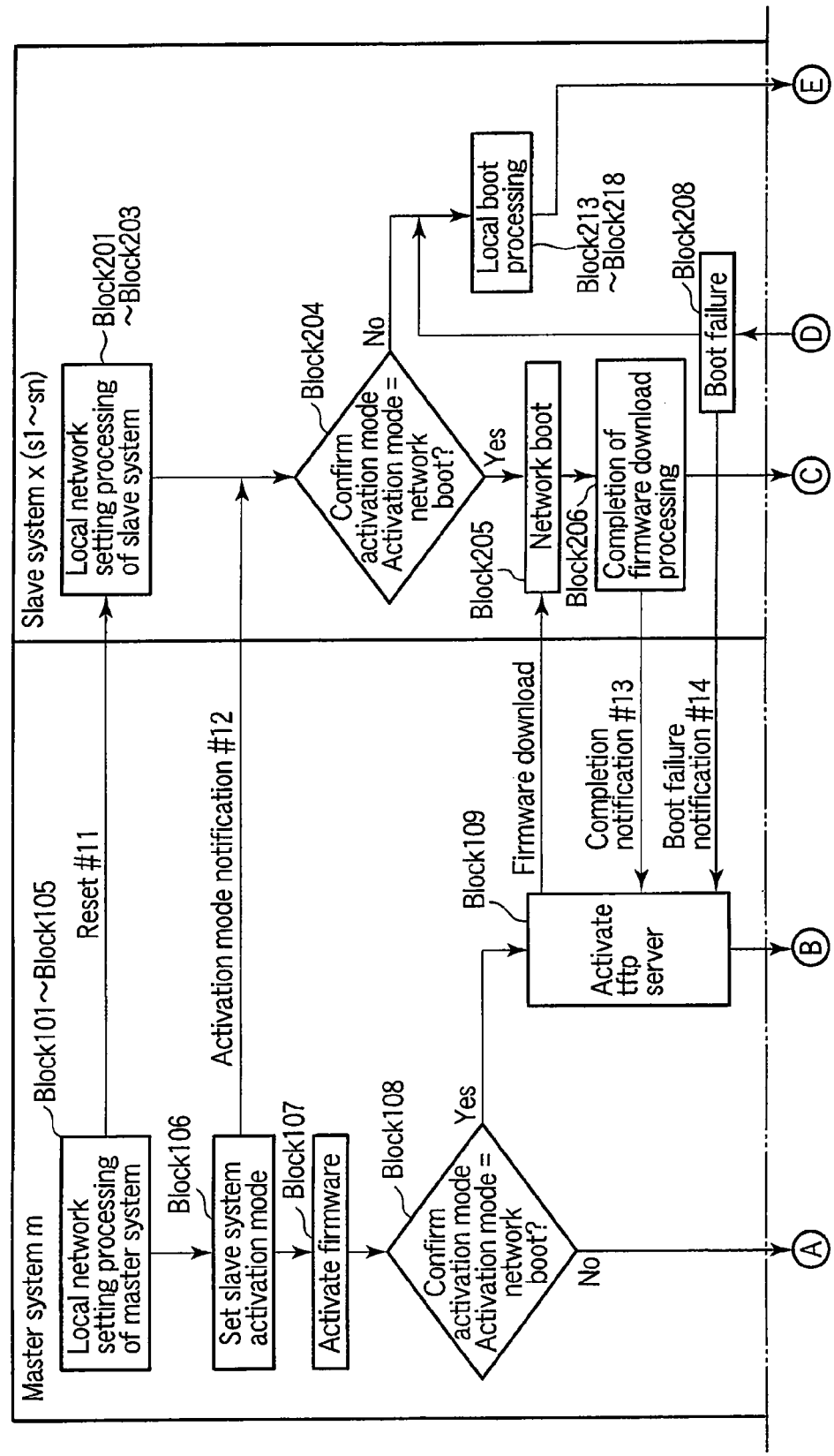
FIGS. 4A and 4B are flowcharts showing an example of first activation processing according to the first embodiment.

Various embodiments will be described hereinafter with reference to the accompanying drawings.

In general, according to one embodiment, a control system includes a first controller, a second controller, and a network connector. The network connector is configured to network-connect the first controller and the second controller. The first controller is configured to designate an activation mode of the second controller. The second controller is configured to be activated based on firmware corresponding to the activation mode.

FIG. 1 is a block diagram showing an example of a closed system (control system) common to the first, second, and third embodiments.

As shown in FIG. 1, a closed system a includes a board a-1. On the board a-1, a plurality of systems (a master system m and slave systems s1 to sn) are mounted. That is, the closed system a includes the master system m and slave systems s1 to sn as a plurality of control modules. Note that the first, second, and third embodiments will explain a case in which the closed system a is configured by a plurality of systems arranged on the single board a-1. Alternatively, the closed system a can be configured by a plurality of independent systems. Also, these embodiments will explain the closed system a including n (n: an integer, n≧2) slave systems s1 to sn. Alternatively, the closed system a may include a single slave system s1.

Furthermore, the closed system a includes a system controller b connected to the master system m. For example, the system controller b controls power supply in the closed system a.

Moreover, the master system m and the respective slave systems s1 to sn are connected via a signal line c, and can exchange control signals via the signal line c. As shown in FIG. 2, the control signals can notify "reset", "activation mode", "error", and so forth. For example, the master system m can transmit a control signal used to designate an activation mode to the slave system s1 via the signal line c. Designation of the activation mode by means of the control signal will be described in detail later.

In addition, the closed system a includes a network switch e (for example, an L2 switch), and the master system m and the slave systems s1 to sn are connectable via the network switch e. That is, the network switch e can serve as a connecting module which network-connects the master system m and the slave systems s1 to sn set on the single board a-1.

For example, the network switch e network-connects the master system m and the slave systems s1 to sn to built an internal network (local network). In this case, the internal network is isolated from an external network f. Also, the network switch e can connect the master system m and the slave systems s1 to sn to the external network f.

The closed system a further includes a control bus d, which connects the master system m and the network switch e. Via the control bus d, a network switch such as I2C and SPI can be set. The master system m can transmit a control command used to designate an activation mode to the slave system s1 via the control bus d. As shown in FIG. 3, control commands can notify "activation mode", "error", and so forth. Designation of the activation mode by means of the control command will be described in detail later.

Note that when the master system m controls the slave systems s1 to sn by exchanging packets with the slave systems s1 to sn via the control bus d, the aforementioned signal line c may not be an indispensable component.

The master system m can control, for example, other systems in the closed system a. The master system m can control the slave systems s1 to sn via the signal line c or the control bus d.

The master system m is an IC or LSI including a CPU and memory. Alternatively, the master system m is an IC or LSI including a Digital Signal Processor (DSP) and memory. The master system m is connected to, for example, a RAM m-1, NVRAM/ROM m-2, external memory m-3, and external storage m-4. The RAM m-1 is a main memory of the master system m. The NVRAM/ROM m-2 stores an activation program and local firmware. The external memory m-3 is an external storage medium such as a Secure Digital (SD) Memory Card™ or flash drive. The external storage m-4 is an external storage medium such as a Hard Disk Drive (HDD).

Likewise, the slave system s1 is also an IC or LSI including a CPU and memory. The slave system s1 is connected to, for example, a RAM s1-1, NVRAM/ROM s1-2, external memory s1-3, and external storage s1-4. Likewise, the slave system sn is also an IC or LSI including a CPU and memory. The slave system sn is connected to, for example, a RAM sn-1, NVRAM/ROM sn-2, external memory sn-3, and external storage sn-4.

As described above, the closed system a includes the master system m, slave system s1, and network switch e. The master system m designates the activation mode of the slave system s1, and the slave system s1 is activated based on firmware corresponding to the designated activation mode. Details of activation processing (that is, boot processing) will be described below.

First Embodiment

Figure 4B:
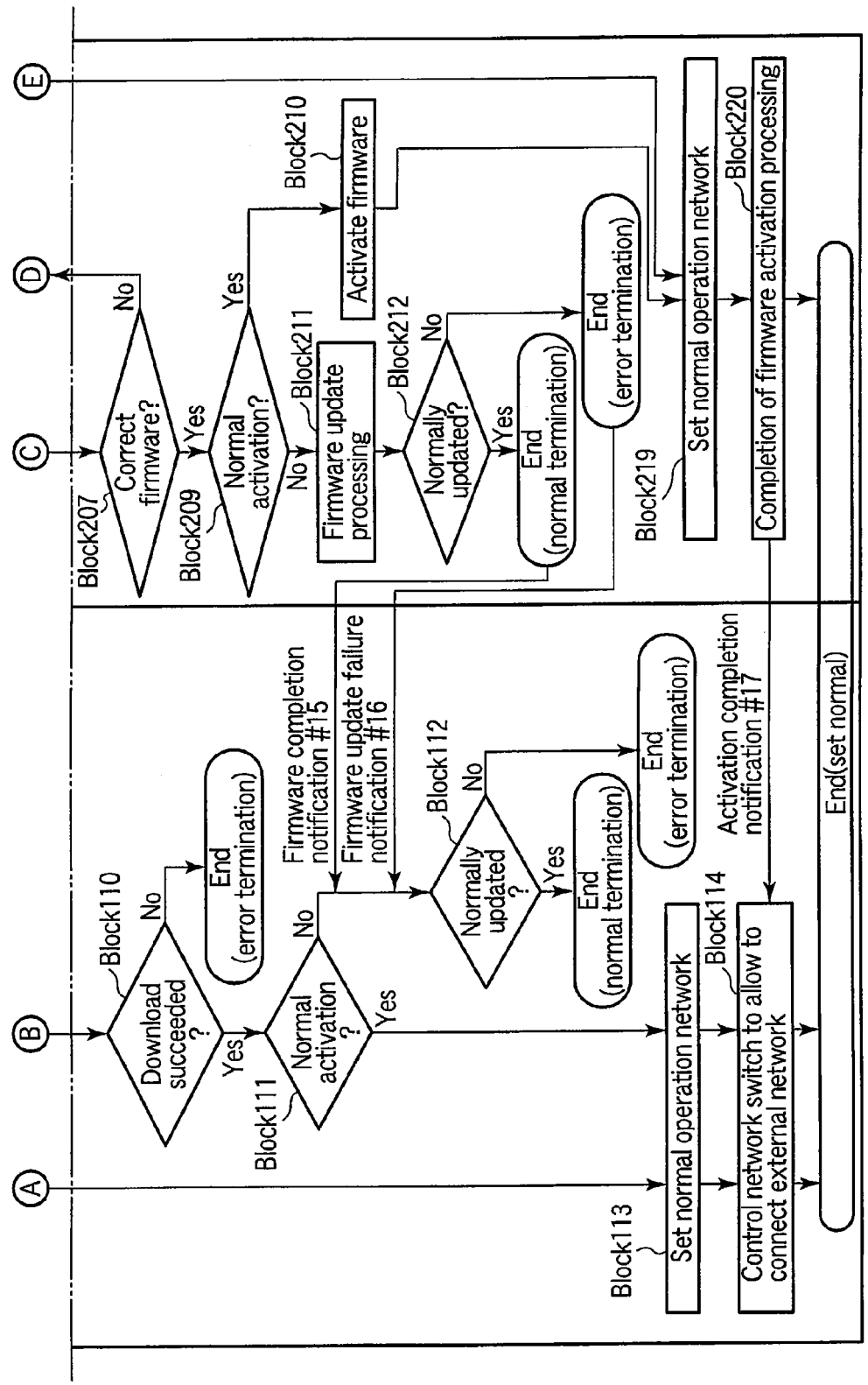
Figure 4E:
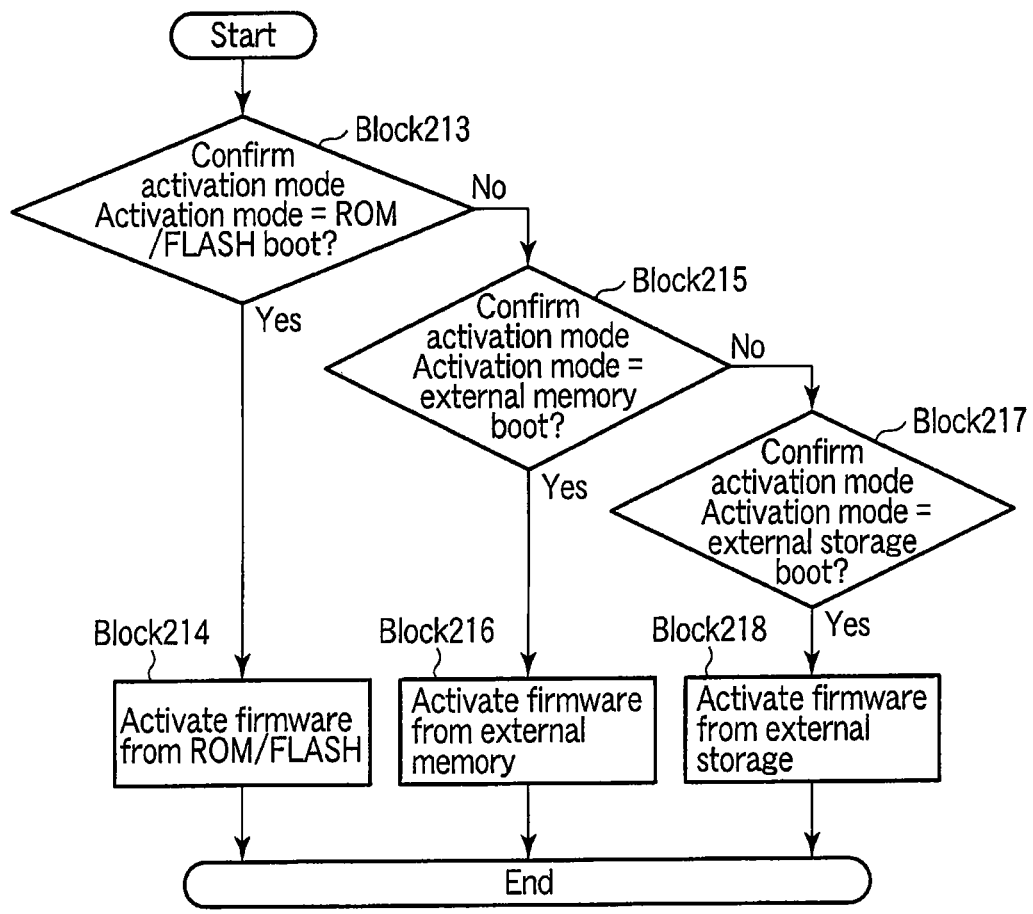
FIG. 4E is a flowchart showing an example of partial processing of the first activation processing according to the first embodiment shown in FIGS. 4A and 4B.

FIGS. 4A and 4B are flowcharts showing an example of first activation processing according to the first embodiment. FIG. 4C is a flowchart showing details of local network setting processing (Block 101 to Block 105) of the master system in the first activation processing. FIG. 4D is a flowchart showing details of local network setting processing (Block 201 to Block 203) of the slave system in the first activation processing. FIG. 4E is a flowchart showing details of local boot processing (Block 213 to Block 218) in the first activation processing.

The first embodiment will exemplify the first activation processing in which the master system m transmits a control signal to a slave system x via the signal line c to activate the slave system x in a predetermined activation mode. Note that the slave system x is one of the slave systems s1, . . . sn.

For example, in response to an activation request from a host control system, the system controller b releases a reset state of the master system m. Then, the master system m is activated (Block 101), and executes (starts) a boot program (Block 102).

The master system m controls the network switch e using the control bus d to disconnect a connection with the external network (Block 103). The master system m sets the internal network (for example, to set a private IP address) (Block 104), and notifies the slave system x of a reset #11 (see FIG. 2) to release a reset state of the slave system x (Block 105). For example, the master system m transmits an activation mode notification #12 (see FIG. 2) by means of a control signal to the slave system x via the control line (or signal line) c (Block 106) to activate firmware (Block 107).

Details of the activation mode notification #12 are as shown in FIG. 2, and this activation mode notification #12 is used to control (designate) the activation mode of a boot device and to control firmware update processing.

The slave system x decides an operation at the time of activation (activation mode) based on the activation mode notification #12. The first embodiment will explain a case in which the master system m transmits the control signal (activation mode notification #12) to the slave system x via the control line c. As will be described in the second and third embodiments, the master system m may transmit a control command (activation mode notification #22) to the slave system x using an IP address for the internal network via the control bus d.

The reset state of the slave system x is released based on the reset #11, and the slave system x is activated (Block 201). The slave system x executes (starts) a boot program (Block 202), and sets the internal network (Block 203). The slave system x confirms the contents of the activation mode notification #12, and is activated according to the activation mode notification #12.

If the slave system x confirms the contents of the activation mode notification #12, and determines that the activation mode notification #12 is an activation mode notification (network activation mode) #12-1 of network boot processing (Yes in Block 204), it executes the network boot processing (Block 205).

The master system m, which transmitted the activation mode notification #12-1 of the network boot processing, activates a tftp server for firmware download processing (Yes in Block 108) (Block 109). The slave system x downloads a boot image. The first embodiment will explain a case in which the master system m activates the tftp server and the slave system x acquires firmware. Alternatively, for example, a communication protocol such as http may be used, or the slave system x may activate a server, and the master system m may put firmware.

Upon completion of the firmware download processing (Block 206), the slave system x transmits a completion notification #13. If the downloaded firmware is correct firmware (Yes in Block 207), the slave system x begins to activate the system based on the downloaded firmware (Yes in Block 209) (Block 210). The slave system x sets a network for a normal operation (Block 219). After completion of activation of the firmware (Block 220), the slave system x transmits an activation completion notification #17 to the master system m.

If the downloaded firmware is incorrect firmware (No in Block 207) (Block 208), the slave system x executes recovery processing. In response to execution of the recovery processing, the slave system x tries, for example, a local activation mode in place of the network activation mode. The local activation mode is an activation mode based on firmware stored in an internal memory such as a ROM/FLASH (Block 213), an activation mode based on firmware stored in an external memory such as an SD memory card (Block 215), or an activation mode based on firmware stored in an external storage such as an HDD (Block 217).

In response to the slave system x having succeeded in the download processing (Yes in Block 110) (Yes in Block 111), the master system m sets a network for a normal operation (Block 113). After activation completion notifications #17 are acquired from all the slave systems s1 to sn, the master system m controls the network switch e to set to allow an external communication (Block 114), and transitions to a normal activation operation. In the case where the slave system x has not succeeded in the download processing (No in Block 110), and has not been activated normally (No in Block 111), if the slave system x is normally updated (Yes in Block 112), the slave system x executes normal termination processing, and if the slave system x is not normally updated (No in Block 112), the slave system x executes error termination processing.

If the slave system x confirms the contents of the activation mode notification #12 and determines that the activation mode notification #12 is an activation mode notification (local activation mode) #12-2 of ROM/FLASH boot processing (Yes in Block 213), it executes the ROM/FLASH boot processing (Block 214). That is, the slave system x reads firmware stored in the ROM/FLASH, and is activated based on the read firmware. Furthermore, the slave system x sets a network for a normal operation (Block 219), and transmits the activation completion notification #17 to the master system m (Block 220).

Or if the slave system x confirms the contents of the activation mode notification #12 and determines that the activation mode notification #12 is an activation mode notification (local activation mode) #12-3 of external memory boot processing (Yes in Block 215), it executes the external memory boot processing (Block 216). That is, the slave system x reads firmware stored in the external memory, and is activated based on the read firmware. Furthermore, the slave system x sets a network for a normal operation (Block 219), and transmits the activation completion notification #17 to the master system m (Block 220).

Or if the slave system x confirms the contents of the activation mode notification #12 and determines that the activation mode notification #12 is an activation mode notification (local activation mode) #12-4 of external storage boot processing (Yes in Block 217), it executes the external storage boot processing (Block 218). That is, the slave system x reads firmware stored in the external storage, and is activated based on the read firmware. Furthermore, the slave system x sets a network for a normal operation (Block 219), and transmits the activation completion notification #17 to the master system m (Block 220).

Or if the slave system x confirms the contents of the activation mode notification #12 and determines that the activation mode notification #12 is an activation mode notification #12-5 of firmware update processing, it executes the firmware update processing.

The master system m, which transmitted the activation mode notification #12-5 of the firmware update processing, activates a tftp server for the firmware update processing (Yes in Block 108) (Block 109), and the slave system x downloads firmware for updating. Upon completion of the firmware download processing (Block 206), the slave system x transmits the completion notification #13. If the downloaded firmware is correct firmware (Yes in Block 207), the slave system x executes update processing based on the downloaded firmware (No in Block 209) (Block 211).

For example, the activation mode notification #12-5 of the firmware update processing includes position information of an update target area. The slave system x updates information (old firmware) stored in the update target area by the downloaded firmware based on this position information of the update target area. If the update processing has succeeded (Yes in Block 212), the slave system x transmits a firmware update completion notification #15, and executes normal termination processing. If the update processing has failed (No in Block 212), the slave system x transmits a firmware update failure notification #16, and executes error termination processing. Upon reception of the firmware update completion notification #15, the master system m executes normal termination processing; upon reception of the firmware update failure notification #16, it executes error termination processing.

The normal termination processing is, for example, processing for stopping power supply to components which are not required to operate after the boot processing. The error termination processing is, for example, to re-execute the failed boot processing (reboot). Or the error terminal processing is, for example, output processing (error display processing) of information indicating a failure of the boot processing.

Note that when the aforementioned position information of the update target area indicates a predetermined area on the external memory, information stored in the predetermined area on the external memory can be updated. When aforementioned position information of the update target area indicates a predetermined area on the external storage, information stored in the predetermined area on the external storage can be updated.

According to the aforementioned first embodiment, the master system m can designate an arbitrary activation mode for the slave systems s1 to sn, and the slave systems s1 to sn can be activated based on the designated arbitrary activation mode. For example, the master system m can designate the network activation mode for the slave system s1, the local activation mode (for example, ROM/FLASH boot) for a slave system s2, the local activation mode (for example, external memory boot) for a slave system s3, and the local activation mode (for example, external storage boot) for a slave system s4. In response to these designations, the slave system s1 can be activated based on the network activation mode, the slave system s2 can be activated based on the local activation mode (for example, ROM/FLASH boot), the slave system s3 can be activated based on the local activation mode (for example, external memory boot), and the slave system s4 can be activated based on the local activation mode (for example, external storage boot).

For example, a predetermined slave system which is allowed to be slowly activated is premised on designation of the network activation mode, and the memory capacity of this predetermined slave system can be reduced. That is, the master system m designates the network activation mode for this predetermined slave system, and this predetermined slave system is activated based on the network activation mode.

Using common firmware to some slave systems, the total memory capacity of the whole closed system can be reduced. For example, it may be configured to download common firmware to some slave systems from a tftp server. The master system m designates the network activation mode for these slave systems, and these slave systems are activated based on the network activation mode.

Also, management such as updating of firmware of respective slave systems is facilitated. For example, when the master system m transmits the activation mode notification #12-5 of the firmware update processing to the respective slave systems, the firmware of the respective slave systems can be updated collectively. For example, in the manufacturing stage or at the time of various settings of the closed system a, the firmware of the respective slave systems can be updated collectively.

Since the master system m can designate an arbitrary activation mode for the slave systems s1 to sn, it can arbitrarily change the firmware of the slave systems s1 to sn. Then, the operations of the slave systems s1 to sn can be dynamically reconfigured.

Since the master system m effects control to interrupt an external connection port of the network switch e at the time of activation, the internal network used for the firmware download processing can be set regardless of an environment or influence of an external network.

Second Embodiment

Figure 5A:
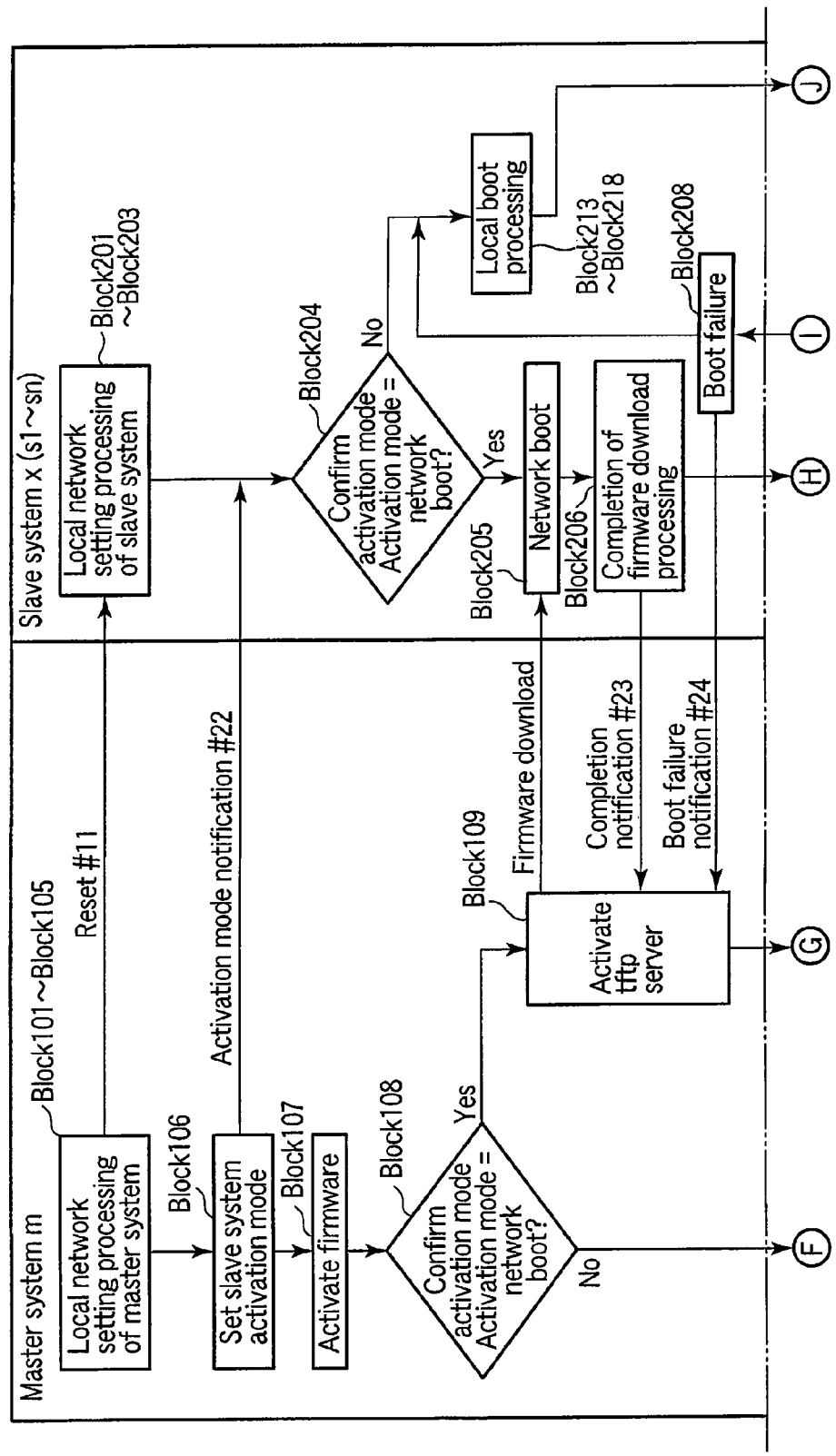
FIGS. 5A and 5B are flowcharts showing an example of second activation processing according to the second embodiment.
Figure 5B:
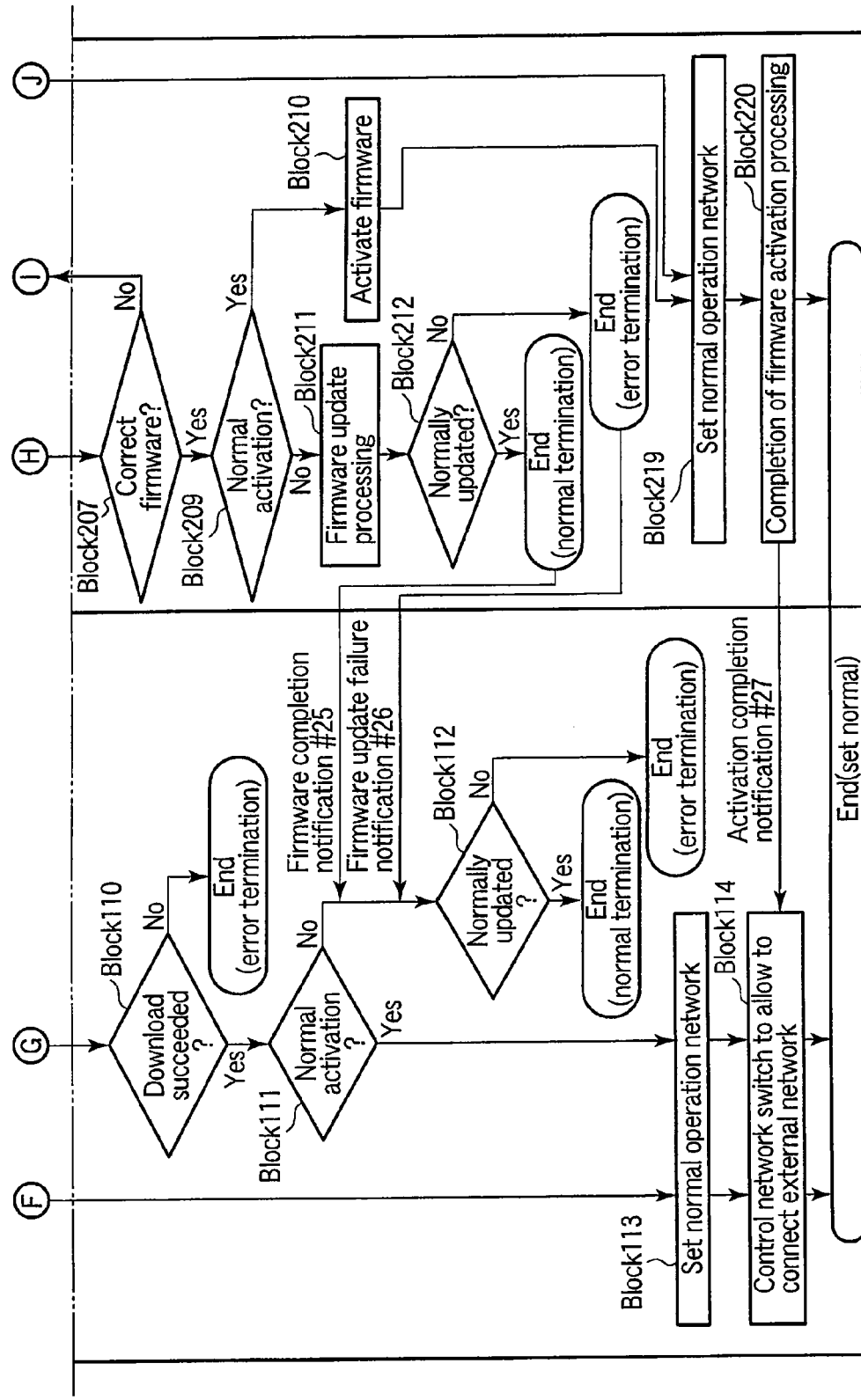

FIGS. 5A and 5B are flowcharts showing an example of second activation processing according to the second embodiment. The second embodiment will exemplify the second activation processing in which a master system m transmits a control command to a slave system x via a control bus d to activate the slave system x in a predetermined activation mode. The second activation processing includes many common points to the aforementioned first activation processing. Hence, in the following description of the second activation processing, points different from the first activation processing will be mainly explained, and points common to the first activation processing will not be repeated. Note that the effects of the second activation processing are also practically the same as those of the aforementioned first activation processing, and a description thereof will not be repeated, either.

The master system m notifies the slave system x of a reset #11 (see FIG. 2) via a control line c to release a reset state of the slave system x (Block 105), and transmits an activation mode notification #22 (see FIG. 3) by means of a control command to the slave system x via the control bus d (Block 106). In response to this notification, the slave system x activates an ftfp server, and is then activated based on the activation mode notification #22 as in the first activation processing.

Third Embodiment

Figure 6A:
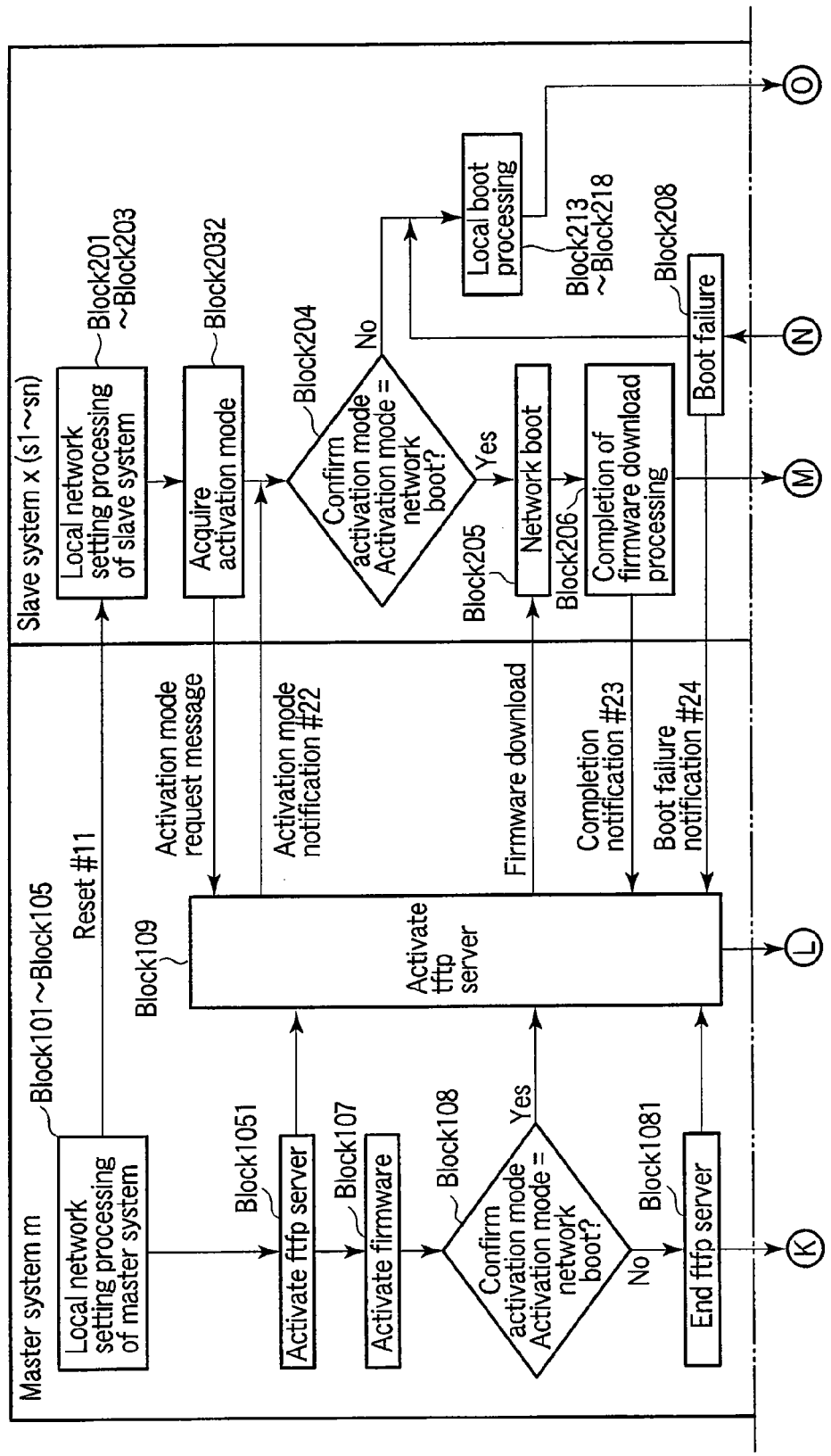
FIGS. 6A and 6B are flowcharts showing an example of third activation processing according to the third embodiment.
Figure 6B:
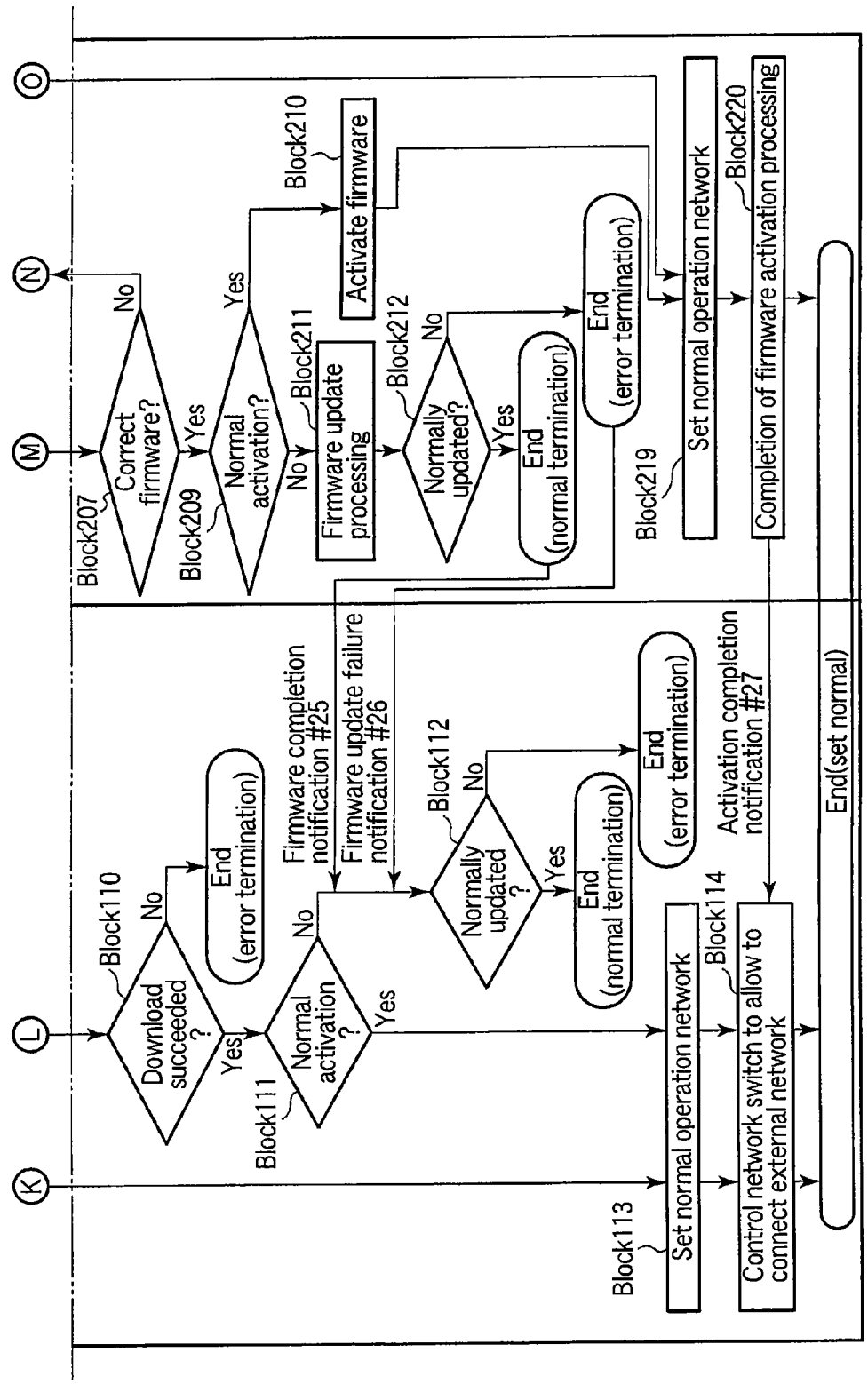

FIGS. 6A and 6B are flowcharts showing an example of third activation processing according to the third embodiment. The third embodiment will exemplify the third activation processing in which a master system m transmits a control command to a slave system x via a control bus d to activate the slave system x in a predetermined activation mode. The third activation processing includes many common points to the aforementioned first activation processing and second activation processing. Hence, in the following description of the third activation processing, points different from the first activation processing and second activation processing will be mainly explained, and points common to the first activation processing and second activation processing will not be repeated. Note that the effects of the third activation processing are also practically the same as those of the aforementioned first activation processing, and a description thereof will not be repeated, either.

The master system m notifies the slave system x of a reset #11 (see FIG. 2) via a control line c to release a reset state of the slave system x (Block 105), and activates an ftfp server (Block 1051). After that, upon completion of a role of the ftfp server, the master system m stops the ftfp server (Block 1081).

Based on the reset #11 from the master system m, the reset state of the slave system x is released, and the slave system x is activated (Block 201). The slave system x executes (starts) a boot program (Block 202), sets an internal network (Block 203), and transmits an activation mode request message used to acquire an activation mode (Block 2032).

The ftfp server receives the activation mode request message, and transmits an activation mode notification #22 (Block 106). After that, as in the first activation processing, the slave system x is activated based on the activation mode notification #22.

Outlines of the first, second, and third embodiments will be completed below.

(1) The closed system of the first, second, and third embodiments includes a plurality of independent systems including the main system m and slave systems s1 to sn. The main system m and the slave systems s1 to sn are connected via the network switch e. The master system m can designate a predetermined activation mode (or predetermined firmware) for each of the slave systems s1 to sn.

(2) The master system m of the closed system of the first embodiment transmits a control signal to the slave systems s1 to sn via the signal line c, and can designate an activation mode (firmware) of the slave systems s1 to sn.

(3) The master system m of the closed system of the second or third embodiment transmits a control command to the slave systems s1 to sn via the control bus d, and can designate an activation mode (firmware) of the slave systems s1 to sn.

(4) The master system m of the closed system of the first, second, and third embodiments can designate, for each of the slave systems s1 to sn, one of a network activation mode in which each slave system downloads firmware via a network and is activated based on the firmware, or a local activation mode in which each slave system reads out firmware from an internal memory, external memory, or external storage, and is activated based on the readout firmware. Then, the slave systems s1 to sn can be activated based on the designated network or local activation mode.

(5) The master system m of the closed system of the first, second, and third embodiments can designate a firmware update mode for a predetermined slave system x of the slave systems s1 to sn or for all the slave systems s1 to sn. That is, the master system m transfers firmware for updating to the predetermined slave system x or all the slave systems s1 to sn via a network, and can update the firmware of the predetermined slave system x or all the slave systems s1 to sn.

(6) The master system m of the closed system of the first, second, and third embodiments can designate the aforementioned network activation mode, local activation mode, or firmware update mode at the time of activation.

(7) The master system m of the closed system of the first, second, and third embodiments can control the network switch e to isolate an internal connection port and an external connection before it designates the network activation mode, local activation mode, or firmware update mode.

(8) The slave system x of the closed system of the first, second, and third embodiments can try the local activation mode when it has failed activation based on the designated network activation mode.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control system comprising:
a first control module;
a second control module; and
a network connector configured to network-connect the first control module and the second control module, to disconnect the first control module and the second control module from an external network, and to build an internal network including the first control module and the second control module disconnected from the external network, or to enable communication between the first control module and the external network and to enable communication between the second control module and the external network, wherein the first control module is configured to control, via one or more first processors, the network connector, to build the internal network including the first control module and the second control module disconnected from the external network, and to designate, via an activation mode notification, one of a network activation mode and a local activation mode for the second control module, the second control module is configured to read, via one or more second processors, when the first control module designates the network activation mode, first firmware via the network connector and to be activated based on the first firmware, and is configured to read, when the first control module designates the local activation mode, second firmware from a memory and to be activated based on the second firmware, and the first control module is configured to enable communication with the external network via the network connector after completion of activation of the second control module.

2. The system of claim 1, wherein the first control module and the second control module are configured on a single board.

3. The system of claim 1, wherein the first control module is configured to transmit the first firmware to the second control module via the network connector when the first control module designates the network activation mode.

4. The system of claim 1, wherein the first control module is configured to designate one of the network activation mode and the local activation mode for the second control module via a signal line which connects the first control module and the second control module.

5. The system of claim 1, wherein the first control module is configured to designate one of the network activation mode and the local activation mode for the second control module via the network connector.

6. The system of claim 1, wherein the second control module is configured to be activated based on the local activation mode in response to an error when the first control module designates the network activation mode, and wherein the second control module detects the error when a downloaded firmware is incorrect firmware.

7. A control method comprising:
controlling a network connector with one or more first processors of a first control module to network-connect the first control module and a second control module, disconnect the first control module and the second control module from an external network, and build an internal network including the first control module and the second control module disconnected from the external network, wherein the first control module further designates, via an activation mode notification, one of a network activation mode and a local activation mode for the second control module;

reading with one or more first processors of the second control module, when the first control module designates the network activation mode, first firmware via the network connector, and, when the first control module designates the local activation mode, second firmware from a memory, wherein the second control module is activated based on the read first or second firmware; and enabling with the first control module communication between the first control module and the external network and between the second control module and the external network, via the network connector after completion of activation of the second control module.

8. The method of claim 7, wherein the first control module designates a firmware update for the second control module, and the second control module downloads third firmware base on designation of the firmware update and executes update processing based on the third firmware.

* * * * *